(12) United States Patent
Sorensen

(10) Patent No.: US 9,042,575 B2
(45) Date of Patent: May 26, 2015

(54) PROCESSING AUDIO SIGNALS

(75) Inventor: Karsten Vandborg Sorensen, Stockholm (SE)

(73) Assignee: Skype, Dublin (IE)

( * ) Notice: Subject to any disclaimer, the term of this patent is extended or adjusted under 35 U.S.C. 154(b) by 191 days.

(21) Appl. No.: 13/341,610

(22) Filed: Dec. 30, 2011

(65) Prior Publication Data

US 2013/0148821 A1 Jun. 13, 2013

(30) Foreign Application Priority Data

Dec. 8, 2011 (GB) .................................. 1121147.1

(51) Int. Cl.
*H04R 27/00* (2006.01)
*H04R 1/02* (2006.01)
*H04R 3/00* (2006.01)
*H04M 9/08* (2006.01)
*H04R 3/12* (2006.01)

(52) U.S. Cl.
CPC *H04R 3/12* (2013.01); *H04M 9/082* (2013.01)

(58) Field of Classification Search
CPC ...... H04R 2430/20; H04R 3/02; H04M 9/082
USPC ................ 381/92, 80, 122, 66, 82, 83, 93, 89
See application file for complete search history.

(56) References Cited

U.S. PATENT DOCUMENTS

| | | | |
|---|---|---|---|
| 5,208,864 A | 5/1993 | Kaneda | |
| 5,524,059 A | 6/1996 | Zurcher | |
| 6,157,403 A | 12/2000 | Nagata | |
| 6,232,918 B1 | 5/2001 | Wax et al. | |
| 6,339,758 B1 | 1/2002 | Kanazawa et al. | |
| 6,914,854 B1 | 7/2005 | Heberley et al. | |
| 8,249,862 B1 | 8/2012 | Cheng et al. | |
| 8,325,952 B2 | 12/2012 | Cho | |
| 8,620,388 B2 | 12/2013 | Hayakawa et al. | |
| 8,824,693 B2 | 9/2014 | Ahgren | |
| 8,891,785 B2 | 11/2014 | Sorensen | |

(Continued)

FOREIGN PATENT DOCUMENTS

| | | |
|---|---|---|
| CA | 2413217 | 5/2004 |
| CN | 100446530 | 3/2001 |

(Continued)

OTHER PUBLICATIONS

"Search Report", Application No. GB1116846.5, Jan. 28, 2013, 3 pages.

(Continued)

*Primary Examiner* — Vivian Chin
*Assistant Examiner* — Douglas Suthers
(74) *Attorney, Agent, or Firm* — Sonia Cooper; Jim Ross; Micky Minhas

(57) ABSTRACT

A method, device and computer program product for processing audio signals, the method including determining beamformer filter coefficients to be applied to the audio signals; applying the beamformer filter coefficients to the audio signals; outputting the filtered audio signals from an audio output comprising a plurality of speakers coupled with the device; and receiving at a microphone coupled with the device, the filtered audio signals output from the audio output. The filter coefficients are determined such that the filtered audio signals are suppressed when received at the microphone.

17 Claims, 4 Drawing Sheets

(56) References Cited

U.S. PATENT DOCUMENTS

| | | | |
|---|---|---|---|
| 8,981,994 | B2 | 3/2015 | Sorenson |
| 2002/0015500 | A1 | 2/2002 | Belt et al. |
| 2002/0103619 | A1 | 8/2002 | Bizjak |
| 2002/0171580 | A1 | 11/2002 | Gaus et al. |
| 2004/0125942 | A1 | 7/2004 | Beaucoup et al. |
| 2004/0213419 | A1 | 10/2004 | Varma et al. |
| 2005/0149339 | A1 | 7/2005 | Tanaka et al. |
| 2005/0216258 | A1 | 9/2005 | Kobayashi et al. |
| 2005/0232441 | A1 | 10/2005 | Beaucoup et al. |
| 2006/0015331 | A1 | 1/2006 | Hui et al. |
| 2006/0031067 | A1 | 2/2006 | Kaminuma |
| 2006/0133622 | A1 | 6/2006 | Chen |
| 2006/0153360 | A1 | 7/2006 | Kellermann |
| 2006/0269073 | A1 | 11/2006 | Mao |
| 2007/0164902 | A1 | 7/2007 | Bang et al. |
| 2008/0039146 | A1 | 2/2008 | Jin |
| 2008/0199025 | A1 | 8/2008 | Amada |
| 2008/0232607 | A1 | 9/2008 | Tashev et al. |
| 2008/0260175 | A1 | 10/2008 | Elko |
| 2009/0010453 | A1 | 1/2009 | Zurek et al. |
| 2009/0076810 | A1 | 3/2009 | Matsuo |
| 2009/0076815 | A1 | 3/2009 | Ichikawa et al. |
| 2009/0125305 | A1 | 5/2009 | Cho |
| 2009/0274318 | A1 | 11/2009 | Ishibashi et al. |
| 2009/0304211 | A1* | 12/2009 | Tashev et al. ............ 381/182 |
| 2010/0014690 | A1 | 1/2010 | Wolff et al. |
| 2010/0027810 | A1 | 2/2010 | Marton |
| 2010/0070274 | A1 | 3/2010 | Cho et al. |
| 2010/0081487 | A1 | 4/2010 | Chen et al. |
| 2010/0103776 | A1 | 4/2010 | Chan |
| 2010/0128892 | A1 | 5/2010 | Chen et al. |
| 2010/0150364 | A1 | 6/2010 | Buck et al. |
| 2010/0177908 | A1 | 7/2010 | Seltzer et al. |
| 2010/0215184 | A1 | 8/2010 | Buck et al. |
| 2010/0217590 | A1 | 8/2010 | Nemer et al. |
| 2010/0246844 | A1 | 9/2010 | Wolff |
| 2010/0296665 | A1 | 11/2010 | Ishikawa et al. |
| 2010/0315905 | A1 | 12/2010 | Lee et al. |
| 2010/0323652 | A1 | 12/2010 | Visser et al. |
| 2011/0038486 | A1 | 2/2011 | Beaucoup |
| 2011/0038489 | A1 | 2/2011 | Visser et al. |
| 2011/0054891 | A1 | 3/2011 | Vitte et al. |
| 2011/0158418 | A1 | 6/2011 | Bai et al. |
| 2011/0178798 | A1 | 7/2011 | Flaks et al. |
| 2012/0182429 | A1 | 7/2012 | Forutanpour et al. |
| 2012/0303363 | A1 | 11/2012 | Sorensen |
| 2013/0013303 | A1 | 1/2013 | Strommer |
| 2013/0034241 | A1 | 2/2013 | Pandey et al. |
| 2013/0082875 | A1 | 4/2013 | Sorensen |
| 2013/0083832 | A1 | 4/2013 | Sorensen |
| 2013/0083934 | A1 | 4/2013 | Åhgren |
| 2013/0083936 | A1 | 4/2013 | Sorensen |
| 2013/0083942 | A1 | 4/2013 | Åhgren |
| 2013/0083943 | A1 | 4/2013 | Sorensen |
| 2013/0129100 | A1 | 5/2013 | Sorensen |
| 2013/0136274 | A1 | 5/2013 | Åhgren |

FOREIGN PATENT DOCUMENTS

| | | |
|---|---|---|
| CN | 1406066 | 3/2003 |
| CN | 1698395 | 11/2005 |
| CN | 1809105 | 7/2006 |
| CN | 1815918 | 8/2006 |
| CN | 1835416 | 9/2006 |
| CN | 1885848 | 12/2006 |
| CN | 101015001 | 8/2007 |
| CN | 101018245 | 8/2007 |
| CN | 101207663 | 6/2008 |
| CN | 100407594 | 7/2008 |
| CN | 101278596 | 10/2008 |
| CN | 101455093 | 6/2009 |
| CN | 101625871 | 1/2010 |
| CN | 101667426 | 3/2010 |
| CN | 101685638 | 3/2010 |
| CN | 101828410 | 9/2010 |
| CN | 102111697 | 6/2011 |
| CN | 102131136 | 7/2011 |
| CN | 1540903 | 10/2014 |
| DE | 19943872 | 3/2001 |
| EP | 0002222 | 6/1979 |
| EP | 0654915 | 5/1995 |
| EP | 1722545 | 11/2006 |
| EP | 1919251 | 5/2008 |
| EP | 1930880 | 6/2008 |
| EP | 2026329 | 2/2009 |
| EP | 2159791 | 3/2010 |
| EP | 2175446 | 4/2010 |
| EP | 2197219 | 6/2010 |
| EP | 2222091 | 8/2010 |
| EP | 2339574 | 6/2011 |
| JP | 2006109340 | 4/2006 |
| JP | 2006319448 | 11/2006 |
| JP | 2006333069 | 12/2006 |
| JP | 2010232717 | 10/2010 |
| TW | 201123175 | 7/2011 |
| WO | WO-0018099 | 3/2000 |
| WO | WO-03010996 | 2/2003 |
| WO | WO-2007127182 | 11/2007 |
| WO | WO-2008041878 | 4/2008 |
| WO | WO-2008062854 | 5/2008 |
| WO | WO-2010098546 | 9/2010 |
| WO | WO-2012097314 | 7/2012 |

OTHER PUBLICATIONS

"Search Report", GB Application No. 1116840.8, Jan. 29, 2013, 3 pages.

"Search Report", GB Application No. 1116843.2, Jan. 30, 2013, 3 pages.

"Search Report", GB Application No. 1116869.7, Feb. 7, 2013, 3 pages.

"Search Report", GB Application No. 1121147.1, Feb. 14, 2013, 5 pages.

"UK Search Report", UK Application No. GB1116848.1, Dec. 18, 2012, 3 pages.

"International Search Report and Written Opinion", Application No. PCT/US2013/058144, (Sep. 11, 2013),10 pages.

"Non-Final Office Action", U.S. Appl. No. 13/212,633, (Nov. 1, 2013),14 pages.

"Non-Final Office Action", U.S. Appl. No. 13/212,688, (Nov. 7, 2013),14 pages.

Knapp, et al., "The Generalized Correlation Method for Estimation of Time Delay", *IEEE Transactions on Acoustics, Speech, and Signal Processing*, vol. ASSP-24, No. 4, (Aug. 1976),pp. 320-327.

"PCT Search Report and Written Opinion", Application No. PCT/2012/066485, (Feb. 15, 2013),12 pages.

"PCT Search Report and Written Opinion", Application No. PCT/US/2012/045556, (Jan. 2, 2013),10 pages.

"PCT Search Report and Written Opinion", Application No. PCT/US2012/2065737, (Feb. 13, 2013),12 pages.

"PCT Search Report and Written Opinion", Application No. PCT/US2012/058145, (Apr. 24, 2013),18 pages.

Grbic, Nedelko et al., "Soft Constrained Subband Beamforming for Hands-Free Speech Enhancement", *In Proceedings of ICASSP 2002*, (May 13, 2002),4 pages.

PCT Search Report and Written Opinion, Application No. PCT/US2012/058146, (Jan. 21, 2013),9 pages.

"PCT Search Report and Written Opinion", Application No. PCT/US2012/068649, (Mar. 7, 2013), 9 pages.

"PCT Search Report and Written Opinion", Application No. PCT/US2012/058148, (May 3, 2013), 9 pages.

"PCT Search Report and Written Opinion", Application No. PCT/US2012/058147, (May 8, 2013), 9 pages.

"PCT Search Report and Written Opinion", Application No. PCT/US2012/058143, (Dec. 21, 2012),12 pages.

Goldberg, et al., "Joint Direction-of-Arrival and Array Shape Tracking for Multiple Moving Targets", *IEEE International Conference on Acoustics, Speech, and Signal Processing*, (Apr. 21, 1997), pp. 511-514.

(56) References Cited

OTHER PUBLICATIONS

Handzel, et al., "Biomimetic Sound-Source Localization", *IEEE Sensors Journal*, vol. 2, No. 6, (Dec. 2002), pp. 607-616.
Kellerman, W. "Strategies for Combining Acoustic Echo Cancellation and Adaptive Beamforming Microphone Arrays", *In Proceedings of ICASSP 1997*, (Apr. 1997), pp. 219-222.
"Search Report", GB Application No. 1108885.3, (Sep. 3, 2012), 3 pages.
"Search Report", GB Application No. 1111474.1, (Oct. 24, 2012), 3 pages.
"Search Report", GB Application No. 1116847.3, (Dec. 20, 2012), 3 pages.
"Non-Final Office Action", U.S. Appl. No. 13/307,994, Dec. 19, 2013, 12 pages.
"Non-Final Office Action", U.S. Appl. No. 13/307,852, Feb. 20, 2014, 5 pages.
"Search Report", GB Application No. 1119932.0, Feb. 28, 2013, 8 pages.
"International Search Report and Written Opinion", Application No. PCT/EP2012/059937, Feb. 14, 2014, 9 pages.
"Foreign Office Action", CN Application No. 201210368101.5, Dec. 6, 2013, 9 pages.
"Foreign Office Action", CN Application No. 201210377130.8, Jan. 15, 2014, 12 pages.
"Non-Final Office Action", U.S. Appl. No. 13/327,308, Mar. 28, 2014, 13 pages.
"Notice of Allowance", U.S. Appl. No. 13/307,994, Apr. 1, 2014, 7 pages.
"Final Office Action", U.S. Appl. No. 13/327,308, Dec. 2, 2014, 6 pages.
"Foreign Office Action", CN Application No. 201210377130.8, Sep. 28, 2014, 7 pages.
"Foreign Office Action", CN Application No. 201210485807.X, Oct. 8, 2014, 10 pages.
"Foreign Office Action", CN Application No. 201210521742.X, Oct. 8, 2014, 16 pages.
"Foreign Office Action", GB Application No. 1121147.1, Apr. 25, 2014, 2 pages.
"Non-Final Office Action", U.S. Appl. No. 13/212,633, Nov. 28, 2014, 16 pages.
"Notice of Allowance", U.S. Appl. No. 13/308,210, Dec. 16, 2014, 6 pages.
"Supplemental Notice of Allowance", U.S. Appl. No. 13/307,852, Oct. 22, 2014, 2 pages.
"Foreign Office Action", CN Application No. 201210367888.3, Jul. 15, 2014, 13 pages.
"Foreign Office Action", CN Application No. 201210368101.5, Jun. 20, 2014, 7 pages.
"Foreign Office Action", CN Application No. 201210377115.3, Aug. 27, 2014, 18 pages.
"Foreign Office Action", CN Application No. 201210377215.6, Mar. 24, 2014, 16 pages.
"Foreign Office Action", CN Application No. 201210462710.7, Mar. 5, 2014, 12 pages.
"Joint Direction-of-Arrival and Array-Shape Tracking for Multiple Moving Targets", IEEE International Conference on Acoustic, Speech, and Signal Processing, Apr. 25, 1997, 4 pages.
"Non-Final Office Action", U.S. Appl. No. 13/308,210, Aug. 18, 2014, 6 pages.
"Non-Final Office Action", U.S. Appl. No. 13/327,250, Sep. 15, 2014, 10 pages.
"Notice of Allowance", U.S. Appl. No. 13/307,852, Sep. 12, 2014, 4 pages.
"Corrected Notice of Allowance", U.S. Appl. No. 13/307,994, Jun. 24, 2014, 2 pages.
"Final Office Action", U.S. Appl. No. 13/212,633, May 23, 2014, 16 pages.
"Final Office Action", U.S. Appl. No. 13/212,688, Jun. 5, 2014, 20 pages.
"Foreign Office Action", CN Application No. 201210368224.9, Jun. 5, 2014, 11 pages.
"Non-Final Office Action", U.S. Appl. No. 13/307,852, May 16, 2014, 4 pages.
"Non-Final Office Action", U.S. Appl. No. 13/308,165, Jul. 17, 2014, 14 pages.
"Notice of Allowance", U.S. Appl. No. 13/308,106, Jun. 27, 2014, 7 pages.
"Supplemental Notice of Allowance", U.S. Appl. No. 13/307,994, Aug. 8, 2014, 2 pages.
"Corrected Notice of Allowance", U.S. Appl. No. 13/307,852, Feb. 20, 2015, 2 pages.
"Corrected Notice of Allowance", U.S. Appl. No. 13/307,852, Dec. 18, 2014, 2 pages.
"Corrected Notice of Allowance", U.S. Appl. No. 13/308,165, Feb. 17, 2015, 2 pages.
"Corrected Notice of Allowance", U.S. Appl. No. 13/308,210, 0/17/2015, 2 pages.
"Foreign Notice of Allowance", CN Application No. 201210368224.9, Jan. 6, 2015, 3 pages.
"Foreign Notice of Allowance", CN Application No. 201210377130.8, Jan. 17, 2015, 3 pages.
"Foreign Notice of Allowance", CN Application No. 201210462710.7, Jan. 6, 2015, 6 pages.
"Foreign Office Action", CN Application No. 201210377215.6, Jan. 23, 2015, 11 pages.
"Foreign Office Action", CN Application No. 201280043129.X, Dec. 17, 2014, 8 pages.
"Foreign Office Action", EP Application No. 12809381.2, Feb. 9, 2015, 8 pages.
"Foreign Office Action", EP Application No. 12878205.9, Feb. 9, 2015, 6 pages.
"Notice of Allowance", U.S. Appl. No. 13/308,165, Dec. 23, 2014, 7 pages.
"Notice of Allowance", U.S. Appl. No. 13/327,250, Jan. 5, 2015, 9 pages.
"Non-Final Office Action", U.S. Appl. No. 13/212,688, Feb. 27, 2015, 23 pages.
"Foreign Office Action", EP Application No. 12784776.2, Jan. 30, 2015, 6 pages.

\* cited by examiner

PROCESSING AUDIO SIGNALS

RELATED APPLICATION

This application claims priority under 35 U.S.C. §119 or 365 to Great Britain Application No. GB 1121147.1, filed Dec. 8, 2011. The entire teachings of the above application are incorporated herein by reference.

TECHNICAL FIELD

This invention relates to processing audio signals, for example during a communication session.

BACKGROUND

Communication systems allow users to communicate with each other over a network. The network may be, for example, the internet or the Public Switched Telephone Network (PSTN). Audio signals can be transmitted between nodes of the network, to thereby allow users to transmit and receive audio data (such as speech data) to each other in a communication session over the communication system.

A device may have audio output means such as speakers for outputting audio signals to the user. The audio signals that are output from the speakers may be received over the network from the user(s) during the call. The speakers may also be used to output audio signals from other audio sources. For example, the device may be a TV in which case the speakers will also output TV audio signals.

The device may also have audio input means such as a microphone that can be used to receive audio signals, such as speech from a user. The user may enter into a communication session with another user, such as a private call (with just two users in the call) or a conference call (with more than two users in the call). The user's speech is received at the microphone, processed and is then transmitted over a network to the other user(s) in the call.

Acoustic echo occurs when the audio signals that are output from a speaker are picked up by a microphone. Techniques to solve this problem are known as acoustic echo cancellation (AEC) methods. Very high amplification in the echo path is a source of severe AEC problems on hands-free devices including TVs. The spectrum of audio signals received at the microphone may be dominated by certain narrow parts where the echo path has a high gain, also known as a resonating frequency. If the echo cancellers on both sides have leakage it gives rise to a phenomenon known as feedback, or howling. When calling a device with similar characteristics feedback can easily occur as both sides will amplify the most in the same part of the spectrum. This can be a severe problem and will interfere with the communication and in some cases render the call useless.

In order to reduce the problems of acoustic echo, microphones are often placed as far away as possible from the speakers. For example a microphone may be placed in the middle of the speakers, or in a corner of the device. This changes the echo path for the better but there will remain frequencies which have high echo path gain causing disturbance during a call.

The use of stereo microphones and microphone arrays in which a plurality of microphones operate as a single device are becoming more common. These enable the use of extracted spatial information in addition to what can be achieved in a single microphone. When using such devices one approach to suppress echo is to apply a beamformer at the microphone. Microphone beamforming is the process of trying to focus the signals received by the microphone array by applying signal processing to enhance sounds coming from one or more desired directions. This may be achieved by estimating the angle (and the distance) from which wanted signals are received at the microphone array. This so-called Direction of Arrival ("DOA") information can be determined or set prior to the beamforming process. In alternative situations it can be advantageous to adapt the desired direction of arrival to changing conditions, and so it may be advantageous to perform the estimation of the desired direction of arrival in real-time as the beamformer is used. Adaptive beamformers apply a number of weights (or "beamformer coefficients") to the received audio signals. These weights can be adapted to take into account the DOA information to process the audio signals received by the plurality of microphones to form a "beam" whereby a high gain is applied to desired audio signals received by the microphones from a desired location (i.e. a desired direction and distance) and a low gain is applied in the directions to any other (e.g. interfering) signal sources.

While the microphone beamformer will attempt to suppress the echo coming from unwanted directions, the number of microphones as well as the shape and the size of the microphone array will limit the effect of the beamformer, and as a result the unwanted echo audio signals are suppressed, but remain audible.

SUMMARY

Beamforming can also be applied for signals output from speakers—known as playout beamforming. Playout beamforming uses constructive interference to output or "playout" audio signals from a plurality of speakers such that the amplitude of the audio signals varies with position across a room. For some locations in the room the audio signals have a low amplitude due to the lack of constructive interference, or due to destructive interference. The inventor has realized that playout beamforming can also be used to improve echo cancellation.

In many user devices, for example TVs, a microphone is often placed in between a speaker arrangement. As a result the physical phenomenon of constructive interference will double the magnitude of the echo relative to the near-end speech, as the signal from each speaker will be in-phase for all frequencies when arriving at the microphone.

The inventor has realized that destructive interference can be exploited to significantly reduce the speaker echo that is received at a microphone.

According to a first aspect of the invention there is provided a method of processing audio signals at a device, the method comprising: determining beamformer filter coefficients to be applied to the audio signals; applying the beamformer filter coefficients to the audio signals; outputting the filtered audio signals from an audio output comprising a plurality of speakers coupled with the device; and receiving at a microphone coupled with the device, the filtered audio signals output from the audio output, wherein the filter coefficients are determined such that the filtered audio signals are suppressed when received at the microphone.

Preferably, the method further comprises determining location information which defines a location of the microphone relative to the speakers and using the location information to determine the beamformer filter coefficients. The location information may include an angle and a distance of the microphone relative to the speakers.

The step of determining location information may comprise determining the time delay for each of the filtered audio signals, output from respective speakers, to arrive at the microphone.

The location information may be determined in real time as the filtered audio signals are outputted from the audio output. Alternatively, the location information may be determined by retrieving known location information from storage at the device.

Preferably, the beamformer filter coefficients define respective filters for application to the audio signals. The respective filters may be determined such that the filtered audio signals are in opposite phase relative to each other at the microphone at a certain frequency.

Preferably, the beamformer filter coefficients define a frequency dependent phase shift that is to be applied to the audio signals.

In one embodiment, the audio signals which are to be filtered are received at the device on a single channel. In another embodiment, the audio signals which are to be filtered are received at the device on one or more independent channels.

According to a second aspect of the invention there is provided a device for processing audio signals, the device comprising: a beamformer for determining filter coefficients to be applied to the audio signals, and for applying the filter coefficients to the audio signals; and an audio output comprising a plurality of speakers for outputting the filtered audio signals, said filtered audio signals received at a microphone coupled with the device, wherein the filter coefficients are determined such that the filtered audio signals are suppressed when received at the microphone.

Preferably, the device comprises means for determining location information which defines a location of the microphone relative to the speakers.

In one embodiment, the beamformer is adaptive and configured to use location information that is determined in real time as the filtered audio signals are output from the audio output means.

Preferably, the microphone is integrated into the device or the microphone is coupled to the device via a wired or wireless connection.

The device may be one of: a television; a mobile phone; a personal digital assistant; a personal computer; or a tablet computer.

According to a third aspect of the invention there is provided a computer program product for processing audio signals, the computer program product being embodied on a non-transient computer-readable medium and configured so as when executed on a processor of a device to perform the method described above.

BRIEF DESCRIPTION OF THE DRAWINGS

For a better understanding of the present invention and to show how the same may be put into effect, reference will now be made, by way of example, to the following drawings in which.

DETAILED DESCRIPTION

In the following embodiments of the invention, a technique is described in which audio signals output from a speaker arrangement are attenuated in the direction of a microphone by exploiting destructive interference to increase robustness to howling and high echo path gains.

Figure 1:
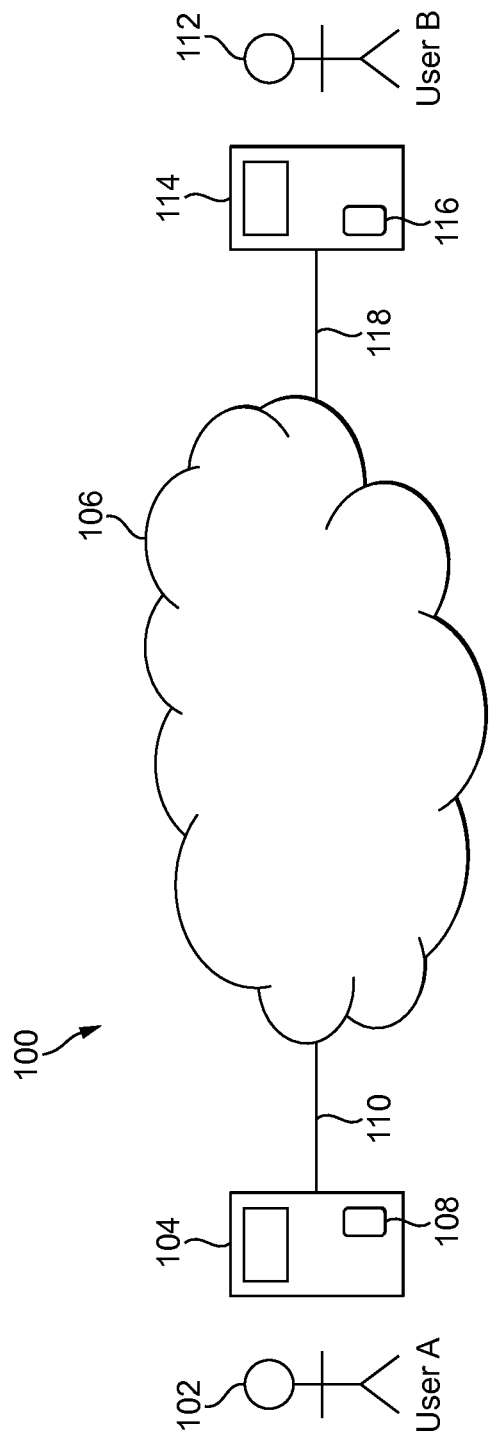
FIG. 1 shows a communication system according to a preferred embodiment.

Reference is first made to FIG. 1, which illustrates a communication system 100 of a preferred embodiment. A first user of the communication system (User A 102) operates a device 104. The device 104 may be, for example a mobile phone, a television, a personal digital assistant ("PDA"), a personal computer ("PC") (including, for example, Windows™, Mac OS™ and Linux™ PCs), a tablet computer, a gaming device or other embedded device able to communicate over the communication system 100.

The device 104 comprises a central processing unit (CPU) 108 which may be configured to execute an application such as a communication client application for communicating over the communication system 100. The communication client application allows the user device 104 to engage in calls and other communication sessions (e.g. instant messaging communication sessions) over the communication system 100. The user device 104 can communicate over the communication system 100 via a network 106, which may be, for example, the Internet or the Public Switched Telephone Network (PSTN). The user device 104 can transmit data to, and receive data from, the network 106 over the link 110.

FIG. 1 also shows a remote node with which the user device 104 can communicate with over the communication system 100. In the example shown in FIG. 1, the remote node is a second user device 114 which is usable by a second user 112 and which comprises a CPU 116 which can execute an application (e.g. a communication client) in order to communicate over the communication network 106 in the same way that the user device 104 communicates over the communications network 106 in the communication system 100. The device 114 may be, for example a mobile phone, a television, a personal digital assistant ("PDA"), a personal computer ("PC") (including, for example, Windows™, Mac OS™ and Linux™ PCs), a tablet computer, a gaming device or other embedded device able to communicate over the communication system 100. The device 114 can transmit data to, and receive data from, the network 106 over the link 118. Therefore User A 102 and User B 112 can communicate with each other over the communications network 106.

Figure 2:
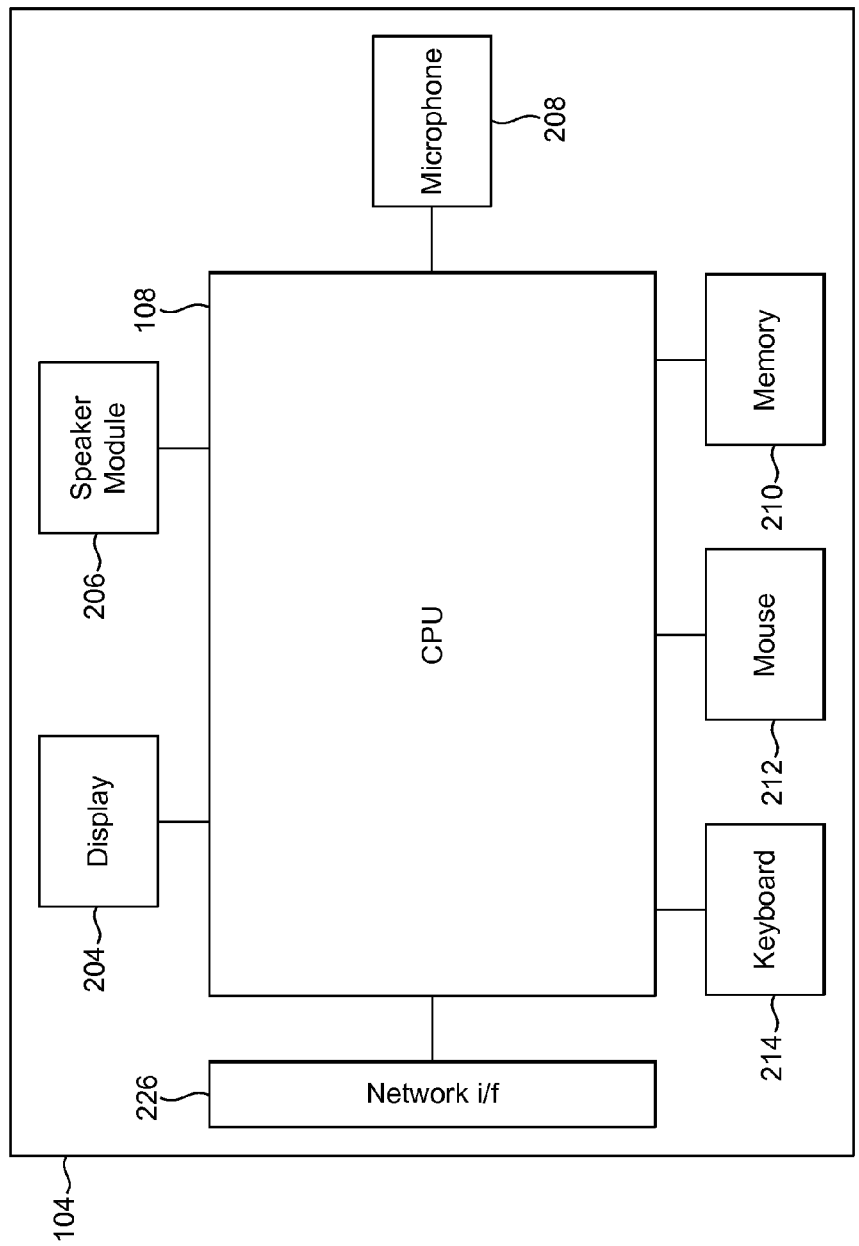
FIG. 2 shows a schematic view of a device according to a preferred embodiment.

FIG. 2 illustrates a schematic view of the user terminal 104 on which the client is executed. The device 104 comprises a CPU 108, to which is connected a display 204 such as a screen. The display 204 may comprise a touch screen for inputting data to the CPU 108. An output audio device 206 (e.g. a speaker module) is connected to the CPU 108. An input audio device such as microphone 208 is connected to the CPU 108. The microphone 208 may be integrated into the user terminal 104, or the microphone 208 may be connected to the user terminal 104 via a wired connection, or the microphone 208 may communicate with the user terminal 104 via a wireless connection (not shown in FIG. 2). In one example, the user terminal 104 is a television and the microphone 208 is integrated into a remote control which communicates wirelessly with the television. The CPU 108 is connected to a network interface 226 for communication with the network 106. The CPU 108 may also be connected to other input devices such as keyboard 214 and a pointing device such as a mouse 212.

Figure 3A:
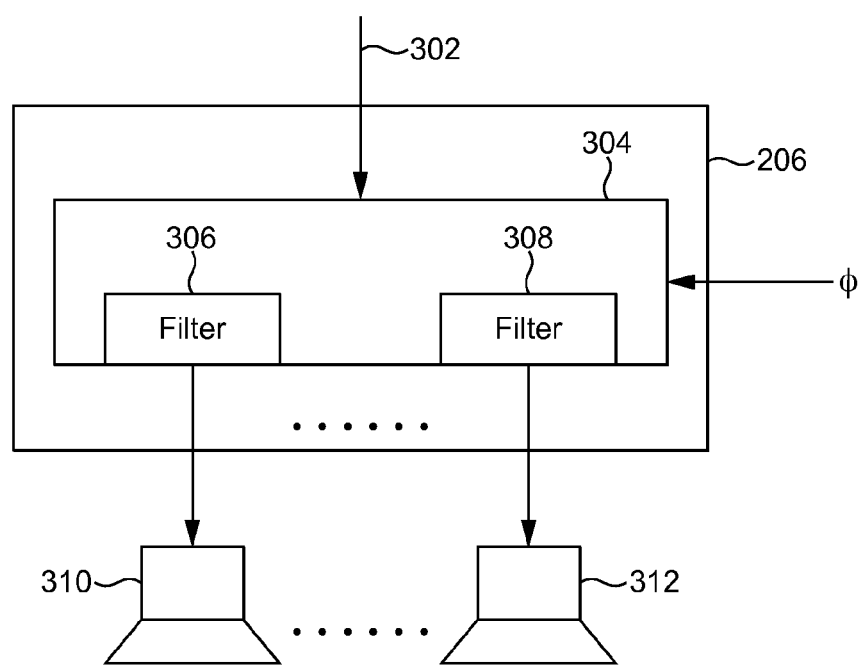
FIG. 3a shows a schematic view of a speaker module according to a preferred embodiment.

The speaker module 206 will now be described in more detail below with reference to FIG. 3*a*.

The speaker module 206 receives audio signals 302 from CPU 108. The audio signals 302 may be received at the device 104 in a number of different ways. For example, the audio signals 302 may be received at device 104 over the network 106 via the network interface 226. Alternatively, the audio signals 302 may originate from television signals broadcast via any suitable means such as a satellite repeater stations, wireless terrestrial repeater stations or cable; and received by a television receiver unit (not shown in FIG. 2) of the device 104. Alternatively, the audio signals 302 may originate from a peripheral device connected to the device 104 using an interface (not shown in FIG. 2). For example the user device may be connected to and configured to receive audio signals from a media appliance such as a games console or video playback device (e.g. a video disc player or a personal video recorder).

The audio signals 302 are supplied to a beamformer 304 for processing. The beamformer 304 processes the audio signals 302 before outputting an audio signal on respective speakers 310,312. Whilst two speakers have been shown in FIG. 3 for simplicity it will be appreciated that more than two speakers may be used to output the audio signals.

The audio signals 302 may be monophonic (often referred to as "mono") such that they are mixed together and routed on a single channel. In this scenario each of the speakers 310,312 would each output a version of the same mono audio signal.

Alternatively, the audio signals 302 may be stereophonic (often referred to as "stereo") such that they are routed on two or more independent channels. In this scenario, the audio on each channel is output using respective speakers 310,312. Thus different audio signals are output from speakers 310, 312 which may vary in amplitude and may have a varying phase relationship with each other.

The beamformer 304 is configured to receive location information ($\phi$) which defines the location of microphone 208 relative to the speakers 310,312. The location information $\phi$ defines the angle (and the distance) of the microphone 208 relative to the speakers 310,312. It will be appreciated that if the microphone 208 and speakers 310,312 are integrated into the device 104 this information will be known and can be stored in memory 210 for retrieval by the beamformer 304.

It will be appreciated by persons skilled in the art that when the microphone 208 and/or speakers 310,312 are not integrated into the device i.e. they are positioned by a user, the location information $\phi$ can be determined in a number of ways.

In order to determine the location information, the time taken (i.e. the time delay) for an audio signal output from each speaker 310,312 to arrive at the microphone 208 needs to be known. To determine this time delay, it is possible to play out an audible sound from each speaker in turn and measure the time delay. This can be quite intrusive for the user of the user terminal, and instead small changes could be made to the audio signal output from the speakers during a call, that would not be highly audible, but would provide valuable information for determining the delay from each speaker to the microphone 208. Band-stop filters can be configured to selectively filter the audio signals prior to being output from respective speakers. Thus, the band-stop filters can be applied during a call, from all but one loudspeaker, and the time it takes for the audio signal output from the loudspeaker without the band stop filter applied, in the particular frequency region where audio signals are attenuated by the speakers that have a band stop filter applied, to arrive at the microphone 208, is an estimate of the time delay for the loudspeaker without the band stop filter applied.

Another approach would be to use a slowly adapting algorithm that controls the signals that are output from the respective loudspeakers such the variance (or "power") of the echo is minimized at the microphone under certain constraints of not distorting too much the signal that is played out.

During processing the beamformer 304 determines filter coefficients that will suppress the audio signals output from speakers 310,312 in the direction of the microphone 208 using the location information $\phi$. That is, the beamformer 304 determines filter coefficients that should be applied to one, or both, of the audio signals before being output via the respective speakers 310,312.

The beamformer 304 then filters the audio signals 302 in accordance with the determined filter coefficients. The beamformer 304 filters one or more of the audio signals 302 by using a filter block. Each speaker has an associated filter block; this is shown in FIG. 3*a* where filter blocks 306,308 are associated with respective speakers 310,312. Whilst the beamformer 304 and filterblocks 306,308 are represented in FIG. 3*a* as hardware devices, the beamformer 304 and filter blocks 306,308 could be implemented in software that is stored in memory 210 and executed on CPU 108.

By applying filters to one or more of the audio signals 302, the phase relationship between the filtered output audio signals can be modified to create a pattern of constructive and destructive interference. That is, the determined beamformer filter coefficients are used such that speakers 310,312 output filtered audio signals that will constructively interfere in certain directions and destructively interfere in other directions. In particular the beamformer 304 applies filter coefficients that result in the filtered audio signals destructively interfering with each other at the microphone 208. In this way the filtered audio signals are suppressed when they are received by the microphone 208. For example, the beamformer 304 may apply filter coefficients that results in the filtered audio signals output from speakers 310,312 being in opposite phase to each other (i.e. 180 degrees out of phase) such that the audio signals destructively interfere with each other in the direction of microphone 208.

Figure 3B:
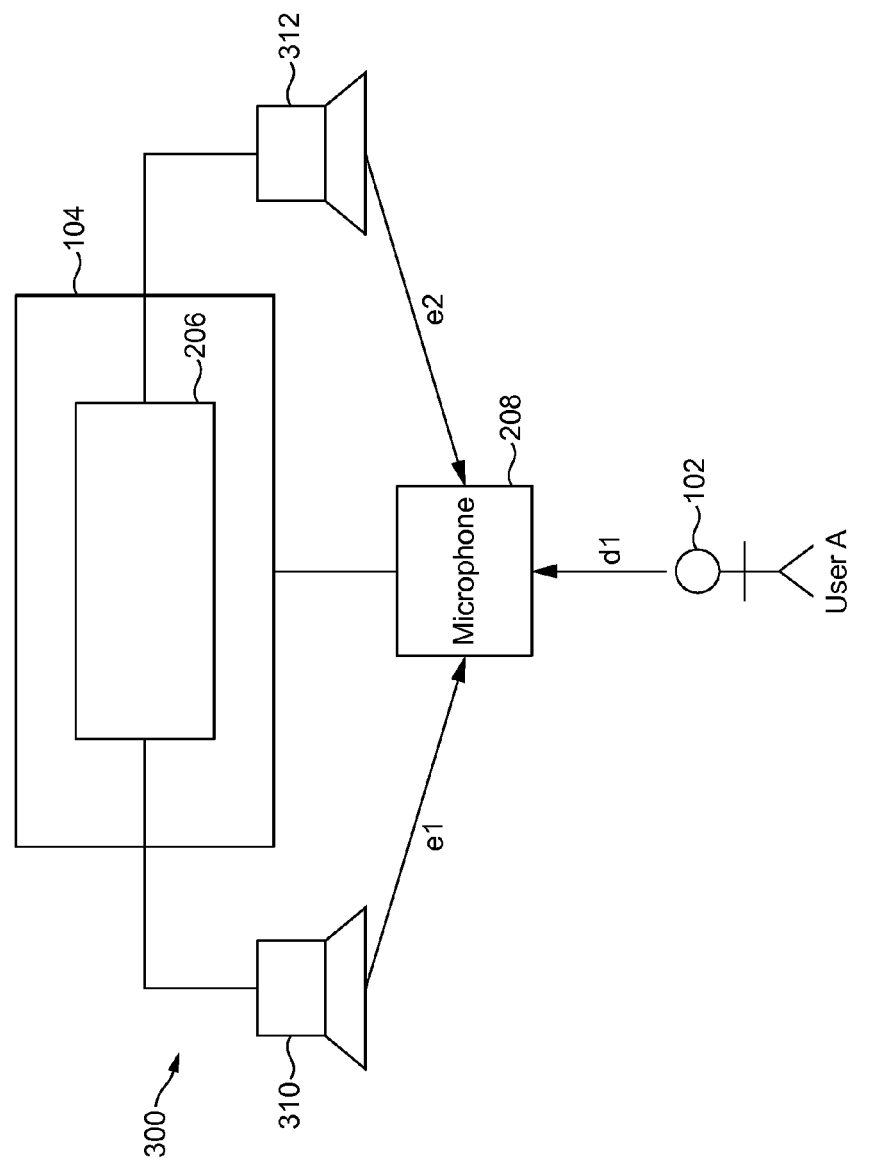
FIG. 3b shows an example environment of the device.

Taking the arrangement in FIG. 3*b* as an example, the environment 300 comprises device 104 and user 102. In FIG. 3*b* whilst microphone 208 and speakers 310,312 have been shown as external devices connected to the user terminal 104 it will be appreciated that microphone 208 and speaker 206 may be integrated into the device 104.

As shown in FIG. 3*b*, user 102 is shown as a source of near-end speech that arrives at the microphone 208 from a principal direction d1. Whilst a single user is shown in FIG. 3*b* for simplicity, it will be appreciated that any number of sources of near-end speech may be present in the environment 300.

Whilst the near-end speech is received at the microphone 208 from a principal direction d1, echo signals e1 and e2 may also be received at the microphone 208 from the speakers 310,312.

To ensure destructive interference of the echo signals e1 and e2 at the microphone 208 a frequency dependent phase shift is required to be applied by the filter blocks 306,308. That is, a low frequency component of the audio signal 302 will be delayed by a greater amount of time than a high frequency component of the audio signal 302 in order to achieve destructive interference of the frequency components of the audio signal at the microphone 208. In practice full destructive interference may not be fully achievable due to asymmetrical reflections, for example, from the walls in a room.

As described above, the beamformer 304 in speaker module 206 determines filter coefficients that will suppress the audio signals output from speakers 310,312 in the direction of the microphone 208 using the location information φ. That is, the beamformer 304 applies maximum attenuation in the direction of the microphone 208 by using filter coefficients that causes the audio signals to destructively interfere in the direction of the microphone 208.

The destructive interference will theoretically completely cancel audio signals output from speakers 310,312 with frequency content that arrives in opposite phase at the microphone 208 for all paths of the echo if the device 104 is setup in a perfectly symmetrical environment 300 and the speakers 310,312 are arranged perfectly symmetrical with respect to the microphone 208.

It will be appreciated that under normal environmental conditions this criteria may not be satisfied due to the size of the room and location of speakers 310,312 relative to the microphone 208. However under normal conditions the destructive interference will substantially cancel audio signals output from speakers 310,312 with frequency content that arrives in opposite phase at the microphone 208 for the direct path of the echo.

The filter blocks 306,308 may, in certain special cases, simply apply a time delay, when for example the only requirement is to achieve maximum suppression at a resonating frequency, and preserve the waveform from each speaker, except from the introduction of the time delay. This is computationally inexpensive and reduces the highest echo path gain.

This can be achieved for a certain dominating frequency of a mono signal, when the microphone is located equidistant between a pair of speakers, by delaying the output from one speaker by exactly half the time period at that dominating frequency. This can be achieved by using filter block 306 to apply a time delay to the signal e1 output from speaker 310 such that it is in opposite phase with signal e2 output from speaker 312 at the dominating frequency. Alternatively, it will be appreciated that the same effect can be achieved by using filter block 308 to apply a time delay to the signal e2 output from speaker 312 such that it is out of phase with signal e1 at the dominating frequency.

It will be appreciated that when only two speakers are used a delay can be applied to only one of the audio signals that are output such that one output audio signal is delayed relative to the other. That is, N−1 delay blocks would be needed if we have N speakers. When more than two speakers are used, having a delay block associated with each speaker enables an appropriate delay to be applied to more than one output audio signal.

When the audio signals 302 comprise two or more independent channels of a stereo signal, the filter blocks associated with each speaker apply an appropriate time delay such that the audio signals output from each of the speakers destructively interfere at the microphone 208.

When more than two speakers are used, the delay applied by the filter coefficients in the beamformer filter blocks is adjusted accordingly such that the audio signals output from each of the speakers destructively interfere at the microphone 208.

In one embodiment of the invention, the beamformer 304 may be an adaptive beamformer such that estimation of the location of microphone 208 is performed in real-time as the beamformer 304 is used. This is particularly advantageous when the microphone 208 is not in a fixed location relative to the speakers 310,312. For example, when multiple participants are involved in a call and a microphone placed upon a desk is moved around on the desk when each of the participants wishes to speak. In these situations, the location information (Φ) is determined in real time and thus, the beamformer is able to maintain suppression of the filtered audio signals at the microphone 208.

It should be understood that the block and flow diagrams may include more or fewer elements, be arranged differently, or be represented differently. It should be understood that implementation may dictate the block and flow diagrams and the number of block and flow diagrams illustrating the execution of embodiments of the invention. It should be understood that elements of the block and flow diagrams described above may be implemented in software, hardware, or firmware. In addition, the elements of the block and flow diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with reference to preferred embodiments, it will be understood to those skilled in the art that various changes in form and detail may be made without departing from the scope of the invention as defined by the appendant claims.

What is claimed is:

1. A method of processing audio signals at a device, the method comprising:
   determining beamformer filter coefficients to be applied to the audio signals, the determining comprising:
      outputting bandstop-filtered audio signals to the all but one of a plurality of speakers and an unfiltered audio signal to a remaining speaker of the plurality of the speakers; and
      estimating a time delay between the remaining speaker of the plurality of the speakers and a microphone coupled to the device;
   applying the determined beamformer filter coefficients to the audio signals;
   outputting the beamforming-filtered audio signals to the plurality of the speakers coupled with the device; and
   receiving at the microphone coupled with the device, the beamforming-filtered audio signals output from the plurality of the speakers, the filter coefficients being determined such that the beamforming-filtered audio signals are suppressed when received at the microphone.

2. The method of claim 1, further comprising determining location information from two or more estimated time delays which define a location of the microphone relative to the speakers and using the location information to determine the beamformer filter coefficients.

3. The method of claim 2, wherein the location information includes an angle and a distance of the microphone relative to the speakers.

4. The method of claim 2, comprising determining the location information in real time as the beamforming-filtered audio signals are output from the speakers.

5. The method of claim 2, wherein determining location information comprises retrieving known location information from storage at the device.

6. The method of claim 1, wherein the beamformer filter coefficients define respective filters for application to the audio signals.

7. The method of claim 6, wherein the respective filters are determined such that the filtered audio signals are in opposite phase relative to each other at the microphone at a certain frequency.

8. The method of claim 1, wherein the beamformer filter coefficients define a frequency dependent phase shift that is to be applied to the audio signals.

9. The method of claim 1, comprising receiving the audio signals which are to be processed on a single channel.

10. The method of claim 1, comprising receiving the audio signals which are to be processed on one or more independent channels.

11. A device for processing audio signals, the device comprising:
   a beamformer for determining filter coefficients to be applied to the audio signals, and for applying the filter coefficients to the audio signals, the determining comprising:
      outputting bandstop-filtered audio signals to the all but one of a plurality of speakers and an unfiltered audio signal to a remaining speaker of the plurality of the speakers; and
      estimating a time delay between the remaining speaker of the plurality of the speakers and a microphone coupled with the device; and
   an audio output configured to output the beamforming-filtered audio signals to the plurality of the speakers, said beamforming-filtered audio signals received at the microphone coupled with the device, wherein the filter coefficients are determined such that the beamforming-filtered audio signals are suppressed when received at the microphone.

12. The device of claim 11, the determining the filter coefficients comprising determining location information from two or more estimated time delays which define a location of the microphone relative to the speakers.

13. The device of claim 11, wherein the beamformer is adaptive and configured to use location information that is determined in real time as the beamforming-filtered audio signals are output from the audio output.

14. The device of claim 11, wherein the microphone is integrated into the device or the microphone is coupled to the device via a wired or wireless connection.

15. The device of claim 11, wherein the device is one of:
   a television; a mobile phone; a personal digital assistant; a personal computer; or a tablet computer.

16. A computer-readable storage memory device comprising instructions for processing audio signals, the instructions executable by a processor to perform the operations comprising:
   determining beamformer filter coefficients to be applied to the audio signals, the determining comprising:
      outputting bandstop-filtered audio signals to all but one of a plurality of speakers and an unfiltered audio signal to a remaining speaker of the plurality of the speakers; and
      estimating a time delay between the remaining speaker of the plurality of the speakers and a microphone coupled to the device;
   applying the determined beamformer filter coefficients to the audio signals;
   outputting the beamforming-filtered audio signals to the plurality of the speakers coupled with the device; and
   receiving at the microphone coupled with the device, the beamforming-filtered audio signals output from the plurality of the speakers, the filter coefficients being determined such that the beamforming filtered audio signals are suppressed when received at the microphone.

17. The computer-readable storage memory device of claim 16, the instructions further executable to perform:
   determining location information from two or more estimated time delays which define a location of the microphone relative to the speakers and using the location information to determine the beamformer filter coefficients.

* * * * *